(12) United States Patent
Grach et al.

(10) Patent No.: US 10,786,947 B2
(45) Date of Patent: Sep. 29, 2020

(54) LEVELING APPARATUS FOR A 3D PRINTER

(71) Applicant: Stratasys Ltd., Rehovot (IL)

(72) Inventors: Uri Grach, MaAle Adumim (IL); Andrew James Carlson, Hopkins, MN (US)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 15/743,686

(22) PCT Filed: Jul. 13, 2016

(86) PCT No.: PCT/IL2016/050753
§ 371 (c)(1),
(2) Date: Jan. 11, 2018

(87) PCT Pub. No.: WO2017/009832
PCT Pub. Date: Jan. 19, 2017

(65) Prior Publication Data
US 2018/0200956 A1    Jul. 19, 2018

Related U.S. Application Data

(60) Provisional application No. 62/191,632, filed on Jul. 13, 2015.

(51) Int. Cl.
*B29C 64/35* (2017.01)
*B29C 64/112* (2017.01)
(Continued)

(52) U.S. Cl.
CPC ............ *B29C 64/35* (2017.08); *B29C 64/112* (2017.08); *B29C 64/209* (2017.08);
(Continued)

(58) Field of Classification Search
CPC ......... B33Y 40/00; B29C 64/00; G03G 15/16
See application file for complete search history.

(56) References Cited

U.S. PATENT DOCUMENTS 5,437,820 A * 8/1995 Brotz ................... B29C 35/10
                                                      264/497
6,169,605 B1 * 1/2001 Penn ...................... H05K 3/125
                                                      358/1.1
(Continued)

FOREIGN PATENT DOCUMENTS

CN        104742376        7/2015
JP        06-179243        6/1994
(Continued)

OTHER PUBLICATIONS

Notification of Office Action and Search Report dated Apr. 1, 2019 From the State Intellectual Property Office of the People's Republic of China Re. Application No. 201680040698.7. (11 Pages).
(Continued)

*Primary Examiner* — Jacob T Minskey
*Assistant Examiner* — Jennifer A Kessie

(57) ABSTRACT

An apparatus includes a roller that skims a layer of material deposited by an additive manufacturing (AM) system, a blade that scrapes material accumulated on the roller, a bath that collects material scraped by the blade, and an auger that transports material collected in the bath to a portion of the bath that extends beyond a length of the roller.

23 Claims, 12 Drawing Sheets

(51) Int. Cl.
*B29C 64/20* (2017.01)
*B29C 64/209* (2017.01)
*B33Y 30/00* (2015.01)
*B29C 64/218* (2017.01)
*B33Y 40/00* (2020.01)

(52) U.S. Cl.
CPC ............ *B29C 64/218* (2017.08); *B33Y 30/00* (2014.12); *B33Y 40/00* (2014.12)

(56) References Cited

U.S. PATENT DOCUMENTS

| | | | |
|---|---|---|---|
| 6,259,962 | B1 | 7/2001 | Gothait |
| 6,305,769 | B1 | 10/2001 | Thayer et al. |
| 6,569,373 | B2 | 5/2003 | Napadensky |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky |
| 7,364,686 | B2 | 4/2008 | Kritchman et al. |
| 7,500,846 | B2 | 3/2009 | Eshed et al. |
| 7,658,976 | B2 | 2/2010 | Kritchman |
| 7,962,237 | B2 | 6/2011 | Kritchman |
| 8,875,976 | B2 * | 11/2014 | Schultz .............. B23K 20/1275 228/2.1 |
| 9,031,680 | B2 | 5/2015 | Napadensky |
| 10,092,975 | B2 * | 10/2018 | Twelves, Jr. ........ B23K 20/1215 |
| 2005/0104241 | A1 | 5/2005 | Kritchman et al. |
| 2010/0067950 | A1 * | 3/2010 | Toyama ................. G03G 15/10 399/159 |
| 2011/0147993 | A1 | 6/2011 | Eshed et al. |
| 2012/0165969 | A1 * | 6/2012 | Elsey ..................... B29C 64/20 700/120 |
| 2013/0040091 | A1 | 2/2013 | Dikovsky et al. |

FOREIGN PATENT DOCUMENTS

| | | |
|---|---|---|
| JP | 10-513130 | 12/1998 |
| JP | 2007-503342 | 2/2007 |
| JP | 2010-072034 | 4/2010 |
| JP | 2012-096430 | 5/2012 |
| WO | WO 2004/106041 | 12/2004 |
| WO | WO 2009/013751 | 1/2009 |
| WO | WO 2009/125381 | 10/2009 |
| WO | WO 2011/011818 | 2/2011 |
| WO | WO 2017/009832 | 1/2017 |

OTHER PUBLICATIONS

International Preliminary Report on Patentability dated Jan. 25, 2018 From the International Bureau of WIPO Re. Application No. PCT/IL2016/050753. (7 Pages).

International Search Report and the Written Opinion dated Oct. 12, 2016 From the International Searching Authority Re. Application No. PCT/IL2016050753.

Translation dated Apr. 26, 2019 of Notification of Office Action dated Apr. 1, 2019 From the State Intellectual Property Office of the People's Republic of China Re. Application No. 201680040698.7. (3 Pages).

Notification of Office Action dated Dec. 26, 2019 From the State Intellectual Property Office of the People's Republic of China Re. Application No. 201680040698.7 and Its Summary in English. (12 Pages).

Notice of Reason for Rejection dated Jul. 10, 2020 From the Japan Patent Office Re. Application No. 2018-502018 and Its Translation Into English. (5 Pages).

\* cited by examiner

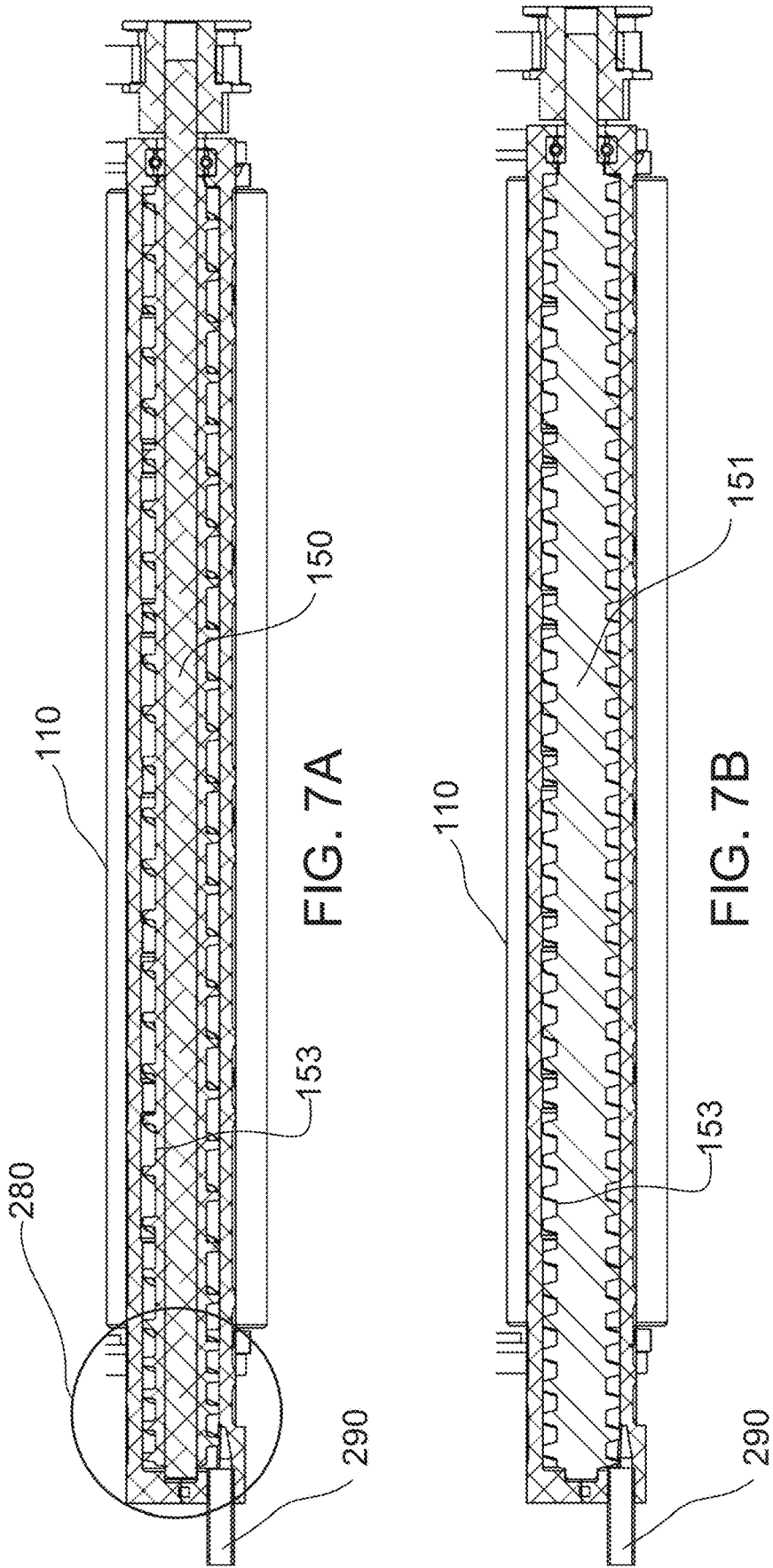

LEVELING APPARATUS FOR A 3D PRINTER

RELATED APPLICATIONS

This application is a National Phase of PCT Patent Application No. PCT/IL2016/050753 having International filing date of Jul. 13, 2016, which claims the benefit of priority under 35 USC § 119(e) of U.S. Provisional Patent Application No. 62/191,632 filed on Jul. 13, 2015. The contents of the above applications are all incorporated by reference as if fully set forth herein in their entirety.

PCT Patent Application No. PCT/IL2016/050753 is also related to U.S. Provisional Patent Application No. 62/191,600, entitled "METHOD AND SYSTEM FOR 3D PRINTING" by Guy MENCHIK et al, U.S. Provisional Patent Application No. 62/191,687, entitled "WASTE DISPOSAL FOR 3D PRINTING" by Scott Wayne BEAVER et al., U.S. Provisional Patent Application No. 62/191,703, entitled "OPERATION OF PRINTING NOZZLES IN ADDITIVE MANUFACTURE" by Andrew James CARLSON et al., and PCT Patent Application No. PCT/IL2015/050722, entitled "METHOD AND SYSTEM FOR ROTATIONAL 3D PRINTING" by Guy MENCHIK et al., the disclosure of which is incorporated herein by reference.

FIELD AND BACKGROUND OF THE INVENTION

The present invention, in some embodiments thereof, relates to freeform manufacturing and, more particularly, but not exclusively, to a leveling apparatus for a freeform manufacturing system.

Additive manufacturing (AM) is generally a process in which a 3D object is manufactured utilizing a computer model of the object. Such a process is used in various fields, such as design related fields for purposes of visualization, demonstration and mechanical prototyping, as well as for rapid manufacturing.

The basic operation of any AM system consists of slicing a 3D computer model into thin cross sections, translating the result into two-dimensional position data and feeding the data to a controller of a system that constructs a 3D structure in a layer-wise manner.

AM entails many different approaches to the method of fabrication, including 3D printing, e.g., 3D inkjet printing, laminated object manufacturing, fused deposition modeling and others.

In 3D printing processes, for example, a building material is dispensed from a dispensing head having a set of nozzles to deposit layers on a supporting structure. Depending on the building material, the layers may then be cured or solidified using a suitable device. The building material may include modeling material, which forms the object, and support material, which supports the object as it is being built.

During the printing process, building material is jetted on top of previous layers and accumulates in height. In order to control height of the 3D object and maintain a level surface, newly jetted, uncured building material passes under a skimming roller. A portion of the material is removed by the roller and gets deposited in a collection bath. The roller assembly typically includes the roller, a scraping blade, the collection bath, and a suction pump. On longer rollers, multiple suction points are used to collect material locally. Maintenance of the roller bath element is accomplished by removing the bath from the assembly.

Various 3D printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,364,686, 7,500,846, 7,658,976, 7,962,237 and 9,031,680, and U.S. Published Application No. 20130040091, all of the same Assignee, the contents of which are hereby incorporated by reference.

For example, U.S. Pat. No. 9,031,680 discloses a system which comprises an AM apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

SUMMARY OF THE INVENTION

According to an aspect of some embodiments of the present invention there is provided a roller assembly with a transport mechanism for transporting the debris collected in a bath of the assembly toward a single output in the assembly. According to some embodiments of the present invention, the transport mechanism generates pressure for pumping the collected debris away from the assembly and is optionally used in place of a pump.

According to an aspect of some embodiments of the present invention there is provided a roller assembly that is adapted for operation with a rotational 3D printing system. According to some embodiments of the present invention, one or more rollers of the assembly are aligned along a radial direction of the rotational 3D printing system. In some exemplary embodiments, the roller is adapted to skim a layer with a substantially same linear velocity at different distances from a rotation axis of the printer.

According to an aspect of some embodiments of the present invention there is provided an apparatus comprising: a roller configured to skim a layer of material deposited by an additive manufacturing (AM) system; a blade configured to scrape material accumulated on the roller; a bath configured to collect material scraped by the blade; and an auger configured to transport material collected in the bath to a portion of the bath that extends beyond a length of the roller.

Optionally, the auger extends over an entire length of the bath.

Optionally, the auger is housed in the bath.

Optionally, the auger is engaged with a motor configured to rotate the auger along its longitudinal axis.

Optionally, the blade extends over an entire length of the roller.

Optionally, a width of the blade extends from the roller to the auger.

Optionally, the portion of the bath that extends beyond the length of the roller includes a cover configured to enclose the portion of the bath.

Optionally, the bath is configured to create a pressure difference between the portion of the bath extends beyond the length of the roller and a second portion of the bath that extends along the length of the roller.

Optionally, the auger includes a variable pitch thread.

Optionally, a pitch of the auger extending over the length of the roller is wider than the pitch of the auger extending over the portion of the bath.

Optionally, the portion of the bath includes a backflow channel configured to prevent backflow from being released toward the roller.

Optionally, a housing of the bath includes wicking channels configured to prevent backflow from being released toward the roller.

Optionally, the AM system is a rotational 3D inkjet printer.

Optionally, the roller is configured to skim the layer off a rotating building tray.

Optionally, the roller extends in a radial direction of the rotating building tray.

Optionally, the roller extends in the radial direction over an entire printing zone of the tray.

Optionally, the roller extends in the radial direction over only a portion of the printing zone of the tray.

Optionally, the roller is stationary in the radial direction.

Optionally, the roller is mounted on a stage that is configured to move in the radial direction.

Optionally, the apparatus includes a plurality of rollers, each extending in the radial direction over a different portion of the printing zone of the tray.

Optionally, each of the plurality of rollers have a different diameter.

Optionally, roller is a conical shaped roller.

According to an aspect of some embodiments of the present invention there is provided an AM system comprising: a dispensing unit configured to dispense building material in a layer-wise manner to manufacture an object; a building tray positioned to receive the building material dispensed, wherein the building tray is configured to rotate while the dispensing unit dispenses the building material; and a leveling assembly configured to level the material dispensed on the tray, wherein the leveling assembly includes: roller configured to skim the building material dispensed, wherein the roller is aligned in a radial direction of the building tray; a blade configured to scrape material accumulated on the roller; a bath configured to collect material scraped by the blade; and an auger configured to transport material collected in the bath to a portion of the bath that extends beyond a length of the roller.

Optionally, the auger extends over an entire length of the bath and is housed in the bath.

Optionally, the auger is engaged with a motor configured to rotate the auger along its longitudinal axis.

Optionally, the roller extends in the radial direction over an entire printing zone of the tray.

Optionally, the roller extends in the radial direction over only a portion of the printing zone of the tray.

Optionally, the roller is stationary in the radial direction.

Optionally, the roller is mounted on a stage that is configured to move in the radial direction.

Optionally, the apparatus includes a plurality of rollers, each extending in the radial direction over a different portion of the printing zone of the tray.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A and 7B are two exemplary cross sectional views cut along a length of an auger in accordance with some embodiments of the present invention;

DESCRIPTION OF SPECIFIC EMBODIMENTS OF THE INVENTION

Figure 1A:
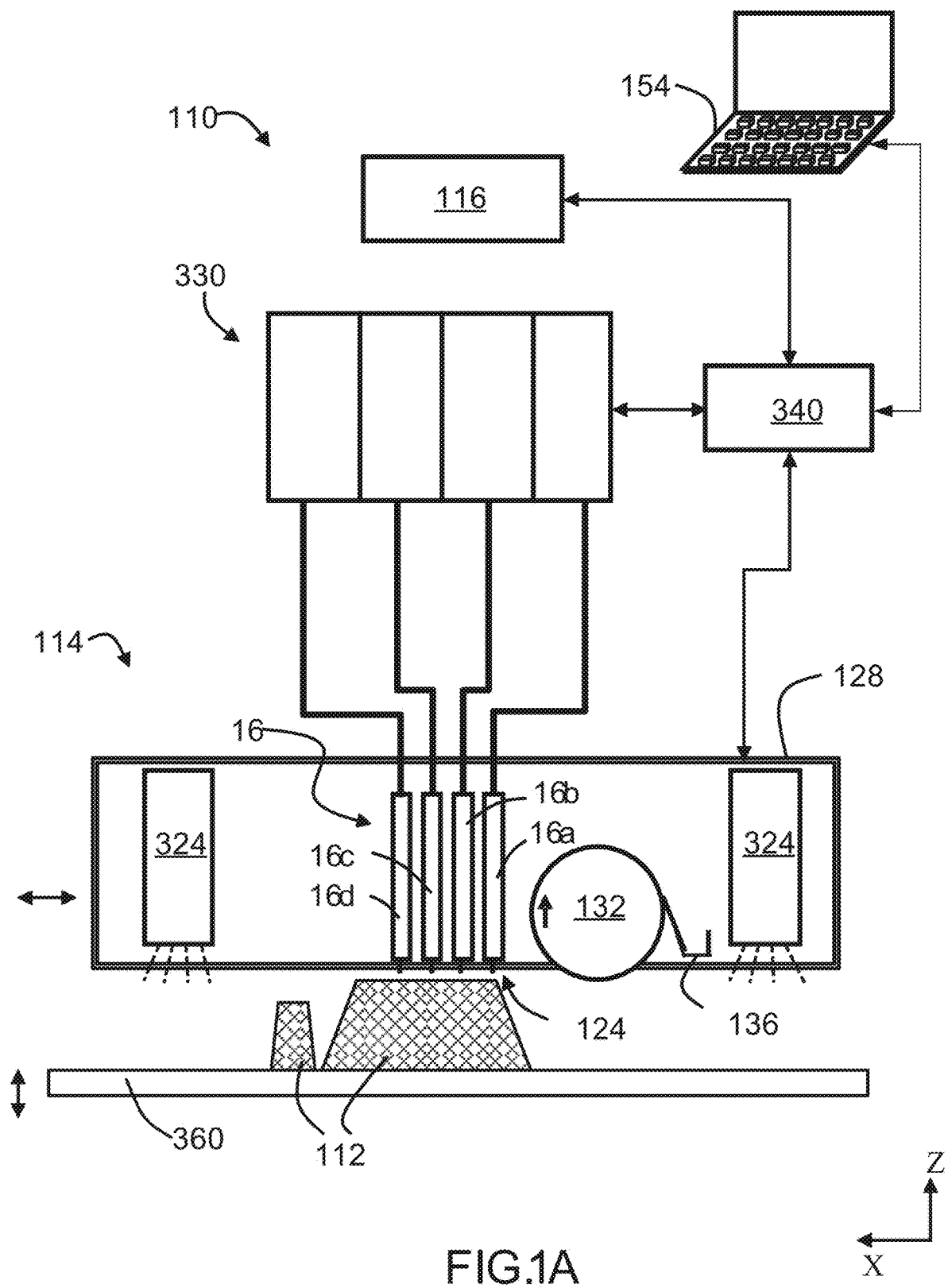
FIGS. 1A-1D are schematic illustrations of an AM system in accordance with some embodiments of the invention.

The present invention, in some embodiments thereof, relates to freeform manufacturing and, more particularly, but not exclusively, to a leveling apparatus for a freeform manufacturing system.

According to some embodiments of the present invention, there is provided a roller assembly that includes a blade for scraping material off the roller, an auger for clearing the blade from material skimmed by the roller and for transporting material scraped off the roller to one area, e.g. one end of the roller. According to some embodiments of the present invention, the auger clears the bath and reduces the maintenance intervals required for cleaning the roller assembly. The single output from which the debris is collected may obviate a region selection valve switch typically used for controlling multiple suction points.

According to some embodiments of the present invention, the auger with roller assembly is designed to generate pressure for pumping the collected building material away from the assembly. A combination of a transport mechanism with volume displacement pumping action can be used to eliminate the suction pump typically used to remove the debris from the bath.

According to some embodiments of the present invention, the roller is integrated in a rotational 3D printing system and is adapted for leveling building material during rotational movement of the system. Typically, the roller is rotated by a motor about its longitudinal axis.

According to some embodiments of the present invention, the roller is defined to have a length that extends along an entire radial printing zone, e.g. all the printing passes of the rotational 3D printer. In other embodiments of the present invention, the roller assembly includes a roller that extends over only one or more passes of the rotational 3D printer (but less than all the passes) and the entire radial printing zone is covered by axially mounting the roller on a moving stage that moves in the radial direction.

In yet other embodiments of the present invention, the roller assembly includes multiple rollers, e.g. positioned in different locations in the radial direction.

Optionally, when a plurality of rollers is used, larger diameters rollers are used for leveling passes further away from the axis of rotation and smaller diameter rollers are used for leveling passes closer to the axis or rotation so that a linear velocity of the rollers as the skims material off of a layer of dispensed material is substantially the same at different distances from the rotational axis. In some exemplary embodiments, the roller is defined to have a cone shape that tapers toward a center of the printing zone. The tapering angle is typically selected to provide same linear velocity at different distances from the rotational axis of the printing zone. Alternatively, a cylindrical roller can be used.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

The method and system of the present embodiments manufacture 3D objects based on computer object data in a layer-wise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an AM apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention, the AM comprises 3D printing, more preferably 3D inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials.

The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in AM and which is able to form a 3D object on its own, i.e., without having to be mixed or combined with any other substance.

The final 3D object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing two or more different modeling materials, each material from a different dispensing head of the AM system. The materials are optionally and preferably deposited in layers during the same pass of the printing heads. The materials and combination of materials within the layer are selected according to the desired properties of the object.

Figure 2A:
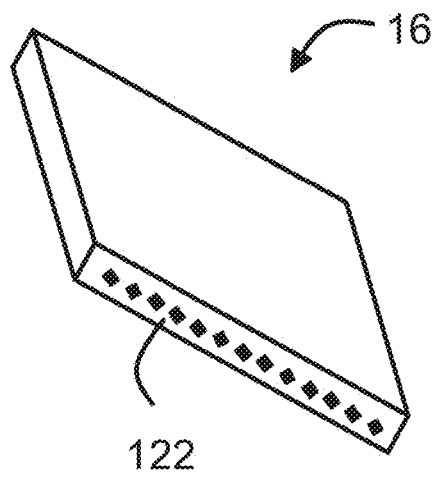
FIGS. 2A-2C are schematic illustrations of printing heads in accordance with some embodiments of the present invention.
Figure 2B:
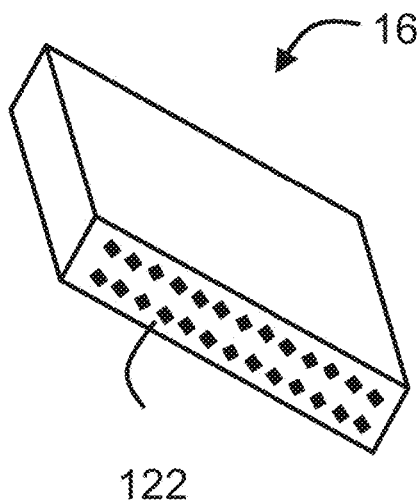
Figure 2C:
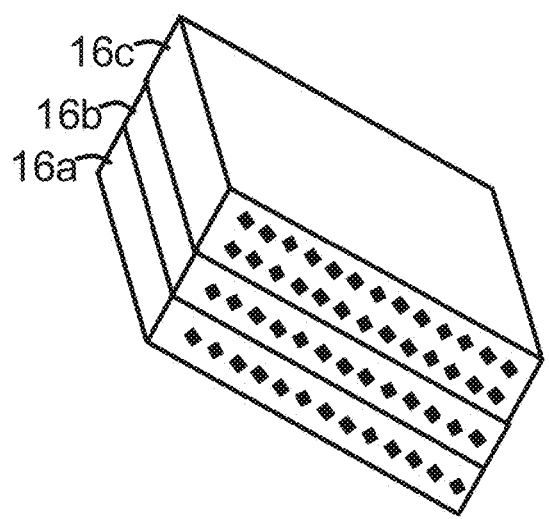

A representative and non-limiting example of a system 110 suitable for AM of an object 112 according to some embodiments of the present invention is illustrated in FIG. 1A. System 110 comprises an AM apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed. Optionally, the building material is a polymer material, e.g. photopolymer material. Optionally, other material is used.

Preferably, but not obligatorily, apparatus 114 is a 3D droplet deposition, e.g. inkjet printing apparatus, in which case the dispensing heads are printing heads, and the building material is preferably dispensed via inkjet technology. This need not necessarily be the case, since, for some applications, it may not be necessary for the AM apparatus to employ 3D inkjet printing techniques. Representative examples of AM apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material in the layer equals the height of support material in the same layer. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or the like that may cause the deposited material to harden. For example, hardening device 324 can include one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

In some exemplary embodiments, the dispensing head and radiation source are preferably mounted on a frame or block 128 which is preferably operative to reciprocally move over a tray and/or print platen 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use in some exemplary embodiments, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form 3D object 112 in a layer-wise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 includes the building material containers or cartridges and supplies a plurality of building materials to AM apparatus 114.

A control unit 340 controls apparatus 114 and optionally and preferably also controls supply system 330. Control unit 340 typically includes an electronic circuit configured to perform the controlling operations. Control unit 340 preferably communicates with a processor 154 which transmits digital data pertaining to fabrication instructions based on computer object data, e.g., a CAD configuration represented on a computer readable medium in a form of a Standard Tessellation Language (STL) format or the like. Typically, processor 154 includes a memory unit and/or memory capability for storing computer object data and for storing data pertaining to fabrication instructions based on computer object data. Typically, control unit 340 controls the voltage applied to each dispensing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
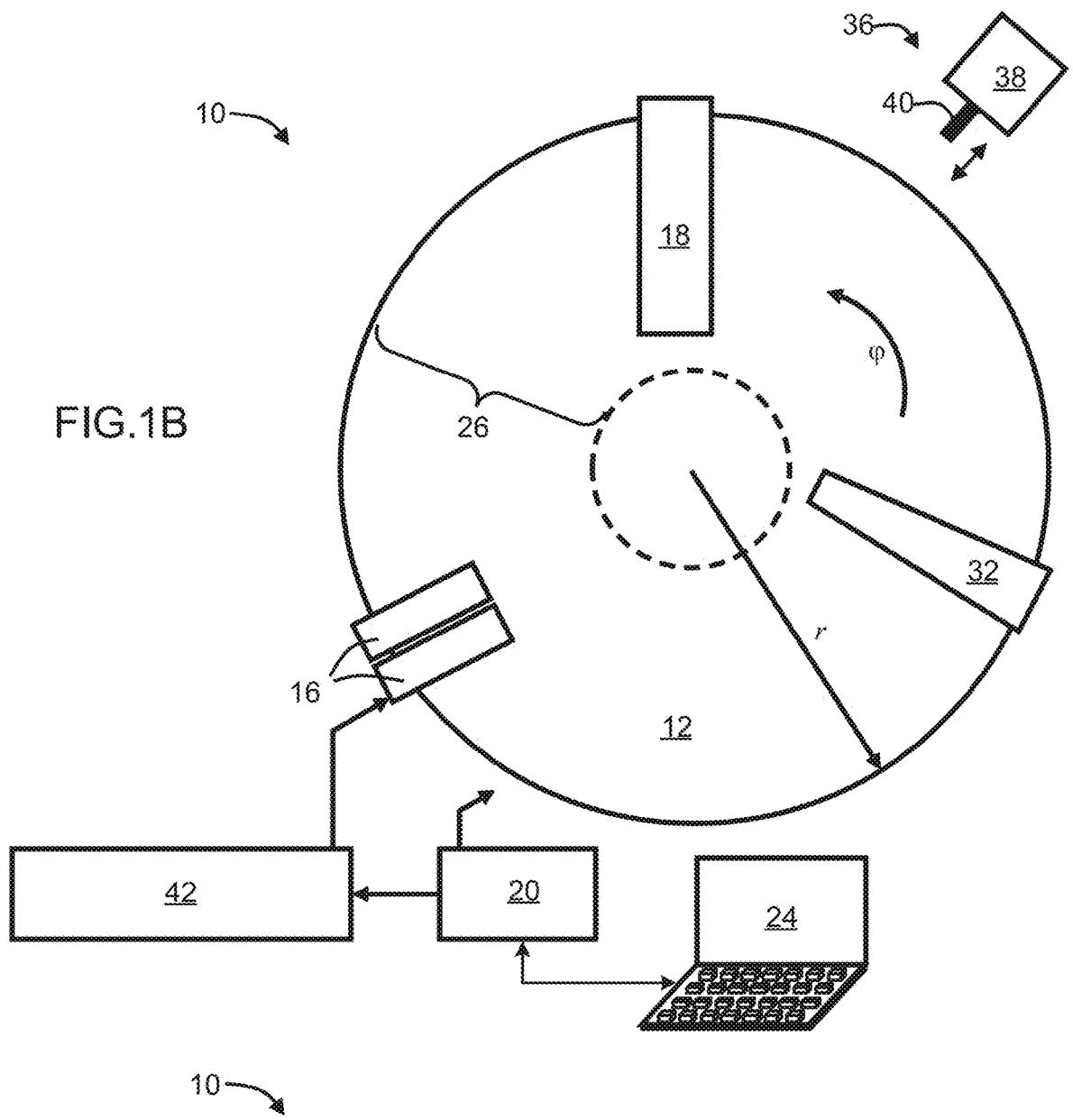
Figure 1C:
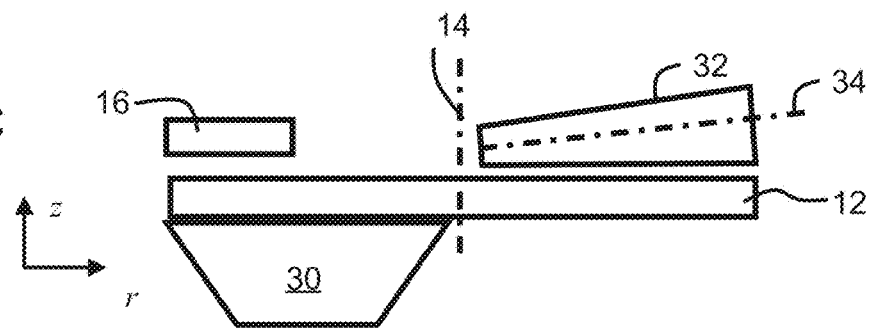
Figure 1D:
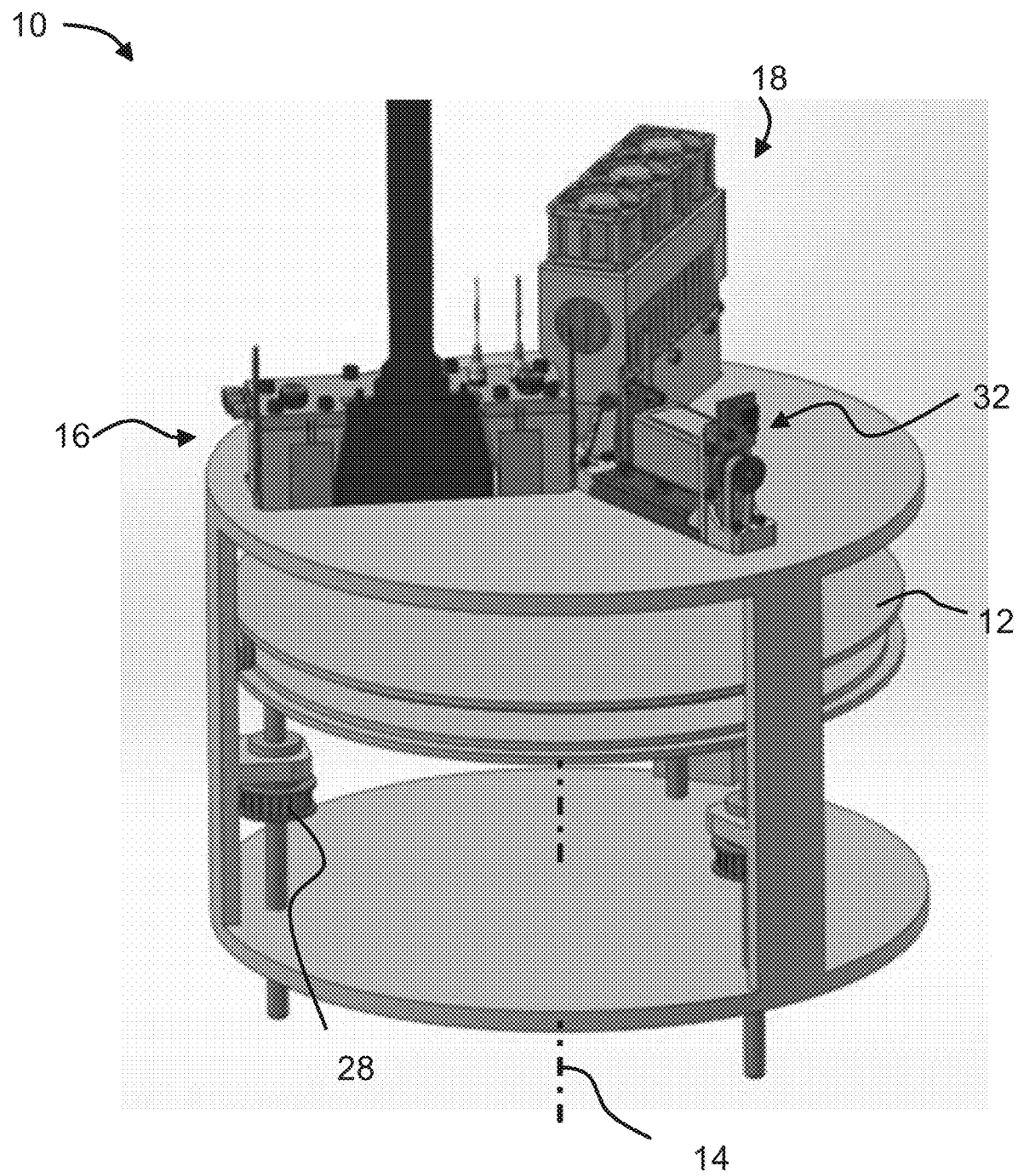

Another representative and non-limiting example of a rotational system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray and/or print platen 12 and a plurality of inkjet printing heads 16, each having a plurality of separated nozzles. Tray 12 can have a shape of a disk or it can be annular. Non-round shapes are also contemplated, provided they can be rotated about a vertical axis. Typically, system 10 also includes one or more radiation sources 18 and one or more leveling devices 32.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersects the vertical axis 14 at a specific point.

Tray 12 serves as a supporting structure for 3D printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1 - \varphi_2$, and the angle between the linear nozzle arrays of the two heads is also $\varphi_1 - \varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a 3D object in a layer-wise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The computer object data formats are typically structured according to a Cartesian system of coordinates.

In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
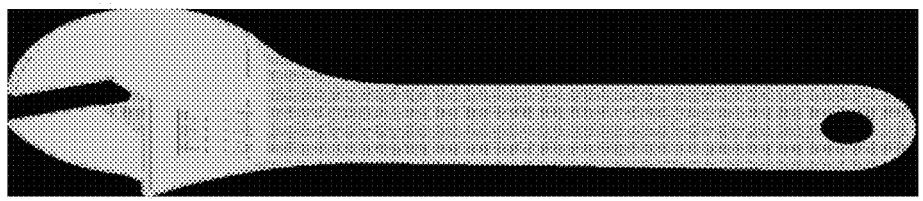
FIGS. 3A-3B are schematic illustrations demonstrating coordinate transformations in accordance with some embodiments of the present invention.
Figure 3B:
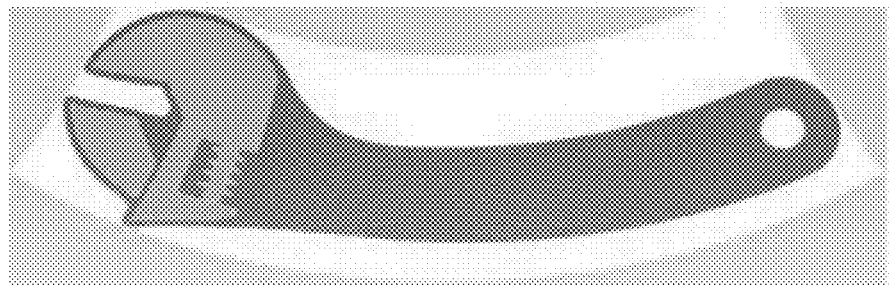

The transformation of coordinates allows 3D printing over a rotating tray. In conventional 3D printing, the printing heads reciprocally move above a stationary tray along straight lines. In such conventional systems, the printing resolution is the same at any point over the tray, provided the dispensing rates of the heads are uniform. Unlike conventional 3D printing, not all the nozzles of the head points cover the same distance over tray 12 during the same time. The transformation of coordinates is optionally and preferably executed so as to ensure equal amounts of excess material at different radial positions. Representative examples of coordinate transformations of computer object data according to some embodiments of the present invention are provided in FIGS. 3A and 3B, showing a slice of an object, where FIG. 3A, illustrate a slice in a Cartesian system of coordinates and FIG. 3B, illustrate the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a 3D object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different 3D spatial locations by different materials, or to effect occupation of substantially the same 3D location or adjacent 3D locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

Figure 4A:
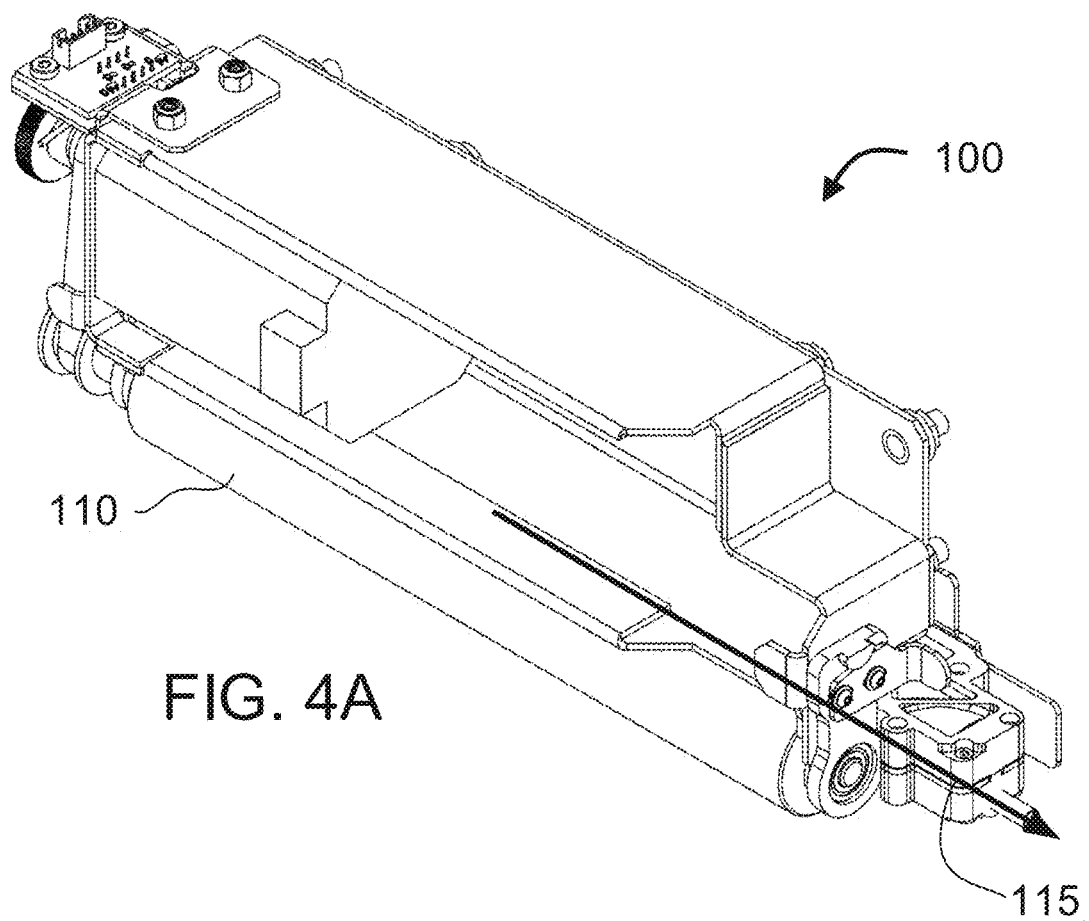
FIGS. 4A-4B are a perspective and front view of an exemplary leveling assembly in accordance with some embodiments of the present invention.
Figure 4B:
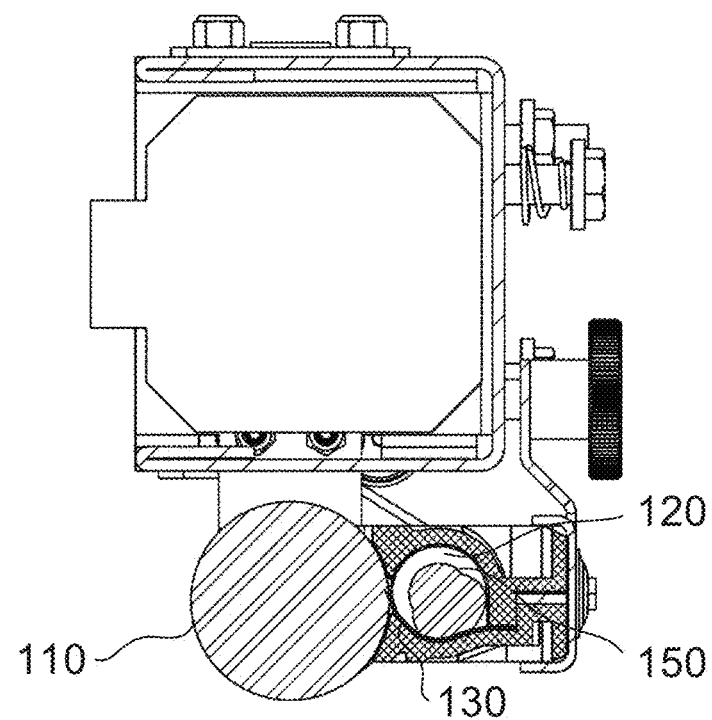

Reference is now made to FIGS. 4A-4B showing a perspective and front view of an exemplary leveling assembly in accordance with some embodiments of the present invention. According to some embodiments of the present invention, the leveling assembly 100 includes a roller 110, a scraping blade 130, a collection bath 120 and an auger 150. As roller 110 skims a surface of a layer deposited for constructing a 3D object, building material is accumulated on roller 110. Blade 130, typically extending over an entire length of roller 110, scrapes material off roller 110. Material that is scraped with blade 130 is typically collected in bath 120. According to some embodiments of the present invention, bath 120 extends along an entire length of roller 110 and also a defined distance beyond roller 110. According to some embodiments of the present invention, auger 150 positioned in bath 120 and extending along its entire length, transports all material in bath 120 in one direction, e.g. direction 115 as it rotates. According to some embodiments of the present invention, auger 150 is rotated by a motor included in the leveling assembly.

According to some embodiments of the present invention, as one end of blade 130 presses against roller 110, an opposite end of blade 130 comes nearly in contact with auger 150. This allows auger 150 to clean blade 130 of substantially all of material collected from roller 110. In some exemplary embodiments, blade 130 extends to a bottom of bath 120 to provide a seamless surface between roller 110, blade 130, and auger 150 so that material does not collect between blade 130 and bath 120. Optionally, blade 130 is similar to blades described for example in U.S. Pat. No. 7,500,846 incorporated herein by reference.

Figure 5:
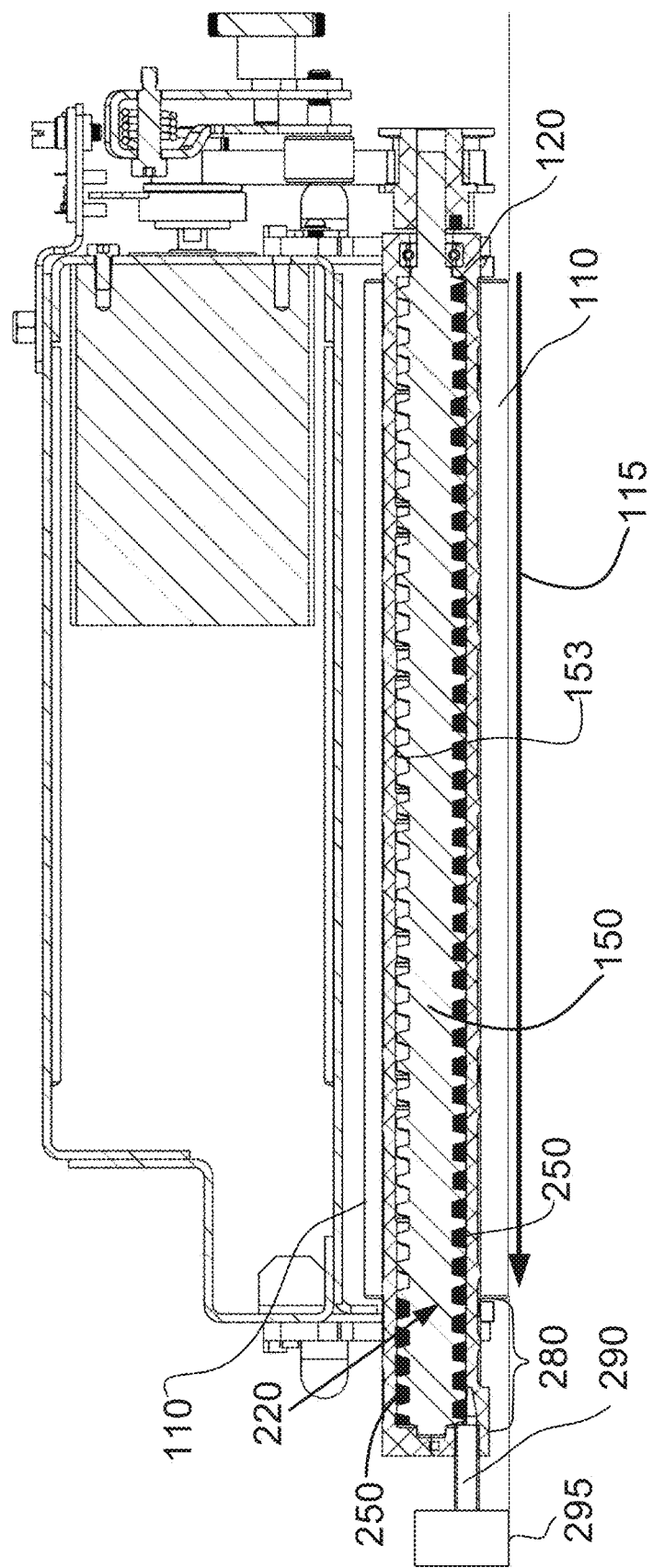
FIG. 5 is a cross sectional view cut along a length of an exemplary leveling assembly in accordance with some embodiments of the present invention.

Reference is now made to FIG. 5 showing a cross sectional view cut along a length of an exemplary leveling assembly in accordance with some embodiments of the present invention. Typically, auger 150 is longer than roller 110 so that it overlaps an entire length of roller 110 and also extends beyond roller 110 in direction 115. Along the length of roller 110, bath 120 is open to allow material 250 scraped off roller 110 to enter bath 120. Material 250 typically accumulates between screw threads 153 of auger 150 in bath 120 and is mechanically transported in direction 115 with rotation of auger 150. According to some embodiments of the present invention, auger 150 transports material 250 toward a pump chamber region 280 and material 250 is removed from bath 120 through valve 290. In some exemplary embodiments, region 280 of bath 120 is enclosed to generate pressure. Typically, a pressure difference is created at interface 220 between enclosed pump chamber region 280 and open area extending along a length of roller 110. In some exemplary embodiments, a peristaltic pump 295 actively removes material 250 from bath 120.

Figure 6A:
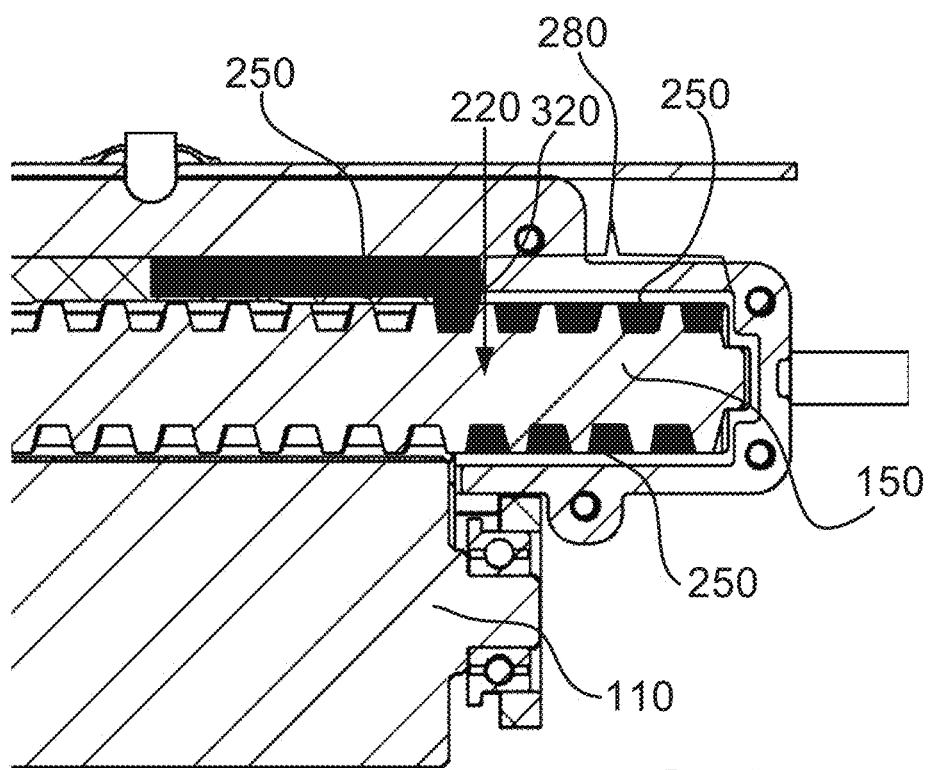
FIGS. 6A and 6B are a detail of cross sectional view cut along a portion of a length and a cross-sectional view cut a pressure difference region of an exemplary leveling assembly in accordance with some embodiments of the present invention.
Figure 6B:
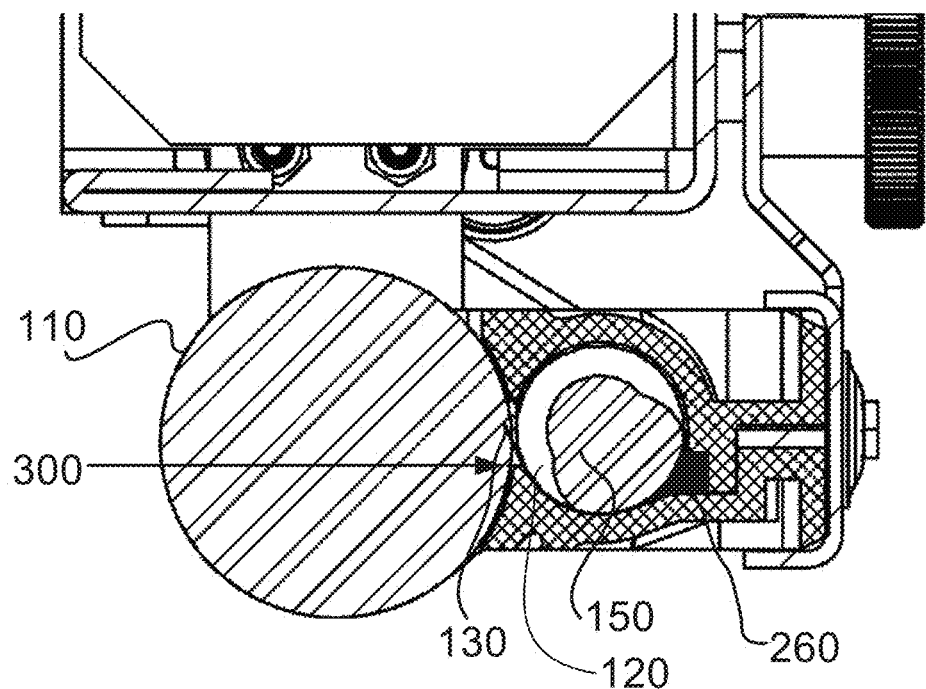

Reference is now made to FIGS. 6A and 6B showing a detail of cross sectional view cut along a portion of a length and a cross-sectional view cut along at a pressure difference interface an exemplary leveling assembly in accordance with some embodiments of the present invention. The pressure difference region 220 along a length of auger 150 may lead to backflow of material 250 away from region 280 through any interface open to nominal pressure. According to some embodiments of the present invention, a backflow channel 320 prevents backflow from being released near roller 110 and outside of the bath 120. This controlled release point directs the backflow into a safe region of bath 120 and reduces a potential for leakage. In some exemplary embodiments, backflow channel 320 also includes a fill space 260 along auger 150 that is lower than a front level 300 of bath 120. Optionally, fill space 260 increases the capacity of bath 120 to prevent leakage.

Figure 6C:
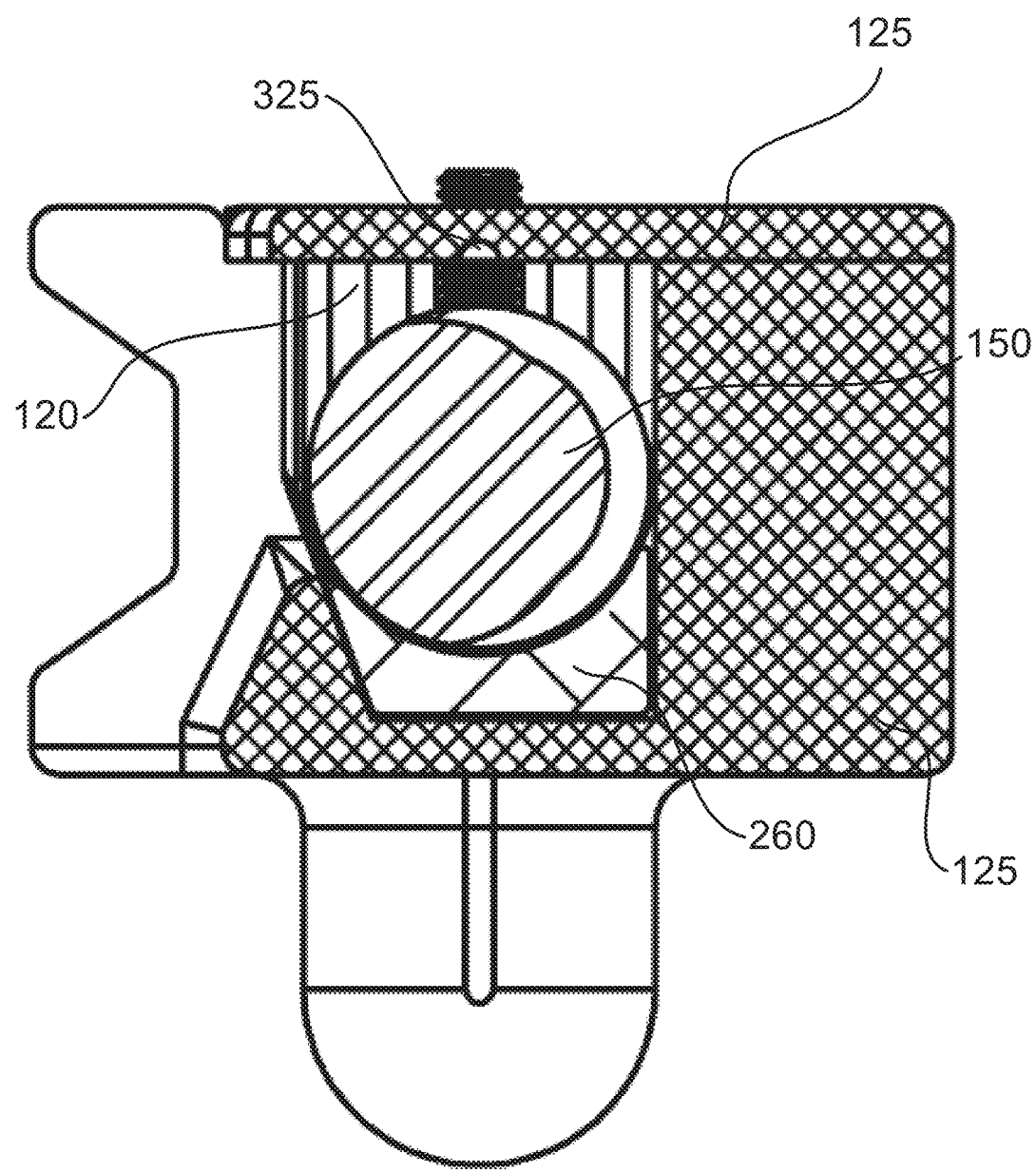
FIG. 6C is a cross-sectional view cut across a housing of the collection bath in accordance with some embodiments of the present invention.

Reference is now made to FIG. 6C showing a cross-sectional view cut across a housing of the collection bath in accordance with some embodiments of the present invention. In some exemplary embodiments, a plurality of wicking channels 325 are introduced on a length of the housing (or cover) 125 of the collection bath 120 as an alternative to the backflow channel 300. Optionally, the wicking channels are in addition to the backflow channels 300. The wicking channels 325 may move resin away from leak points by capturing resin on the auger. This may prevent the resin moving toward the opening on the roller side of the housing 125.

Reference is now made to FIGS. 7A and 7B showing two exemplary cross sectional views cut along a length of an auger in accordance with some embodiments of the present invention. According to some embodiments of the present invention, auger 150 has a variable pitch thread. In some exemplary embodiments, a wider pitch for thread 153 along a length of roller 110 is used to quickly transport material and a tighter pitch for thread 153 is used in region 280 to generate more pressure. Alternatively, an auger 151 has a constant pitch over its entire length. Typically, auger 150 is rotated with a motor optionally connected to auger 150 with a pulley and/or timing belt.

Figure 8A:
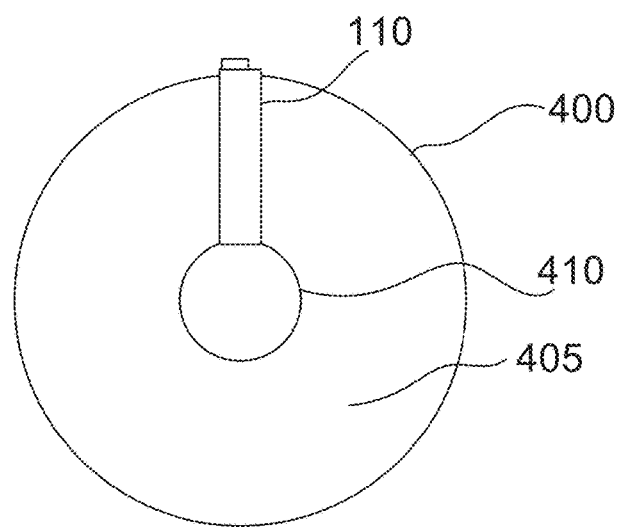
FIGS. 8A, 8B and 8C are schematic diagrams of leveling assemblies covering a printing zone in accordance with some embodiments of the present invention.
Figure 8B:
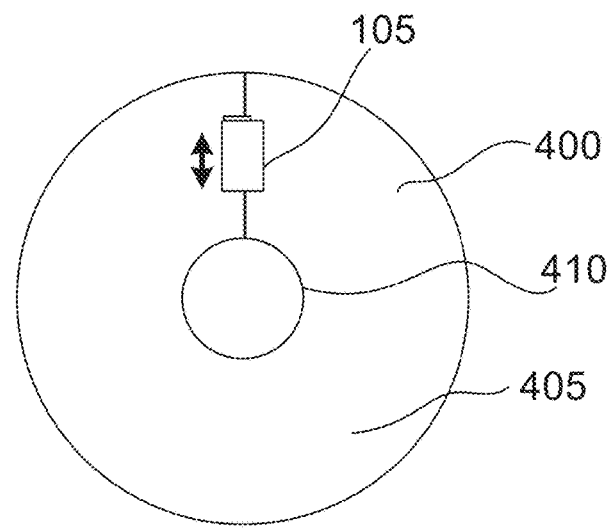
Figure 8C:
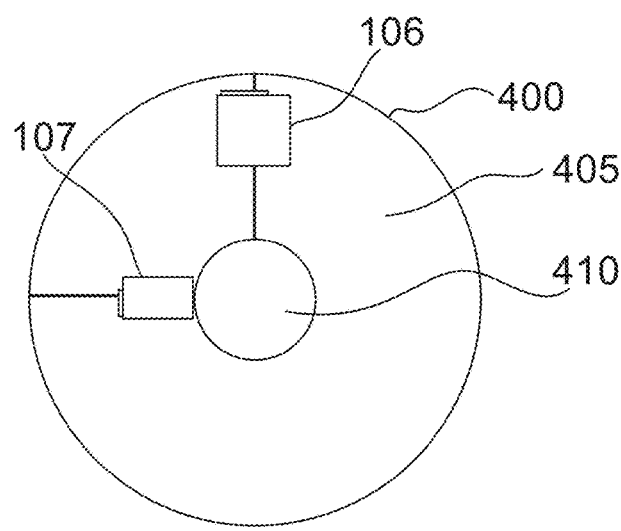

Reference is now made to FIGS. 8A, 8B, and 8C showing a schematic diagrams of leveling assemblies covering a printing zone in accordance with some embodiments of the present invention. Referring to FIG. 8A, according to some embodiments of the present invention, a building tray 400 for a rotational 3D printer includes a printing zone 405 and a non-printing zone 410. Typically, the non-printing zone is a central portion of tray 400. According to some embodiments of the present invention, a length of the roller 110 extends along an entire radial distance of printing zone 405 so that a single roller covers all printing passes (FIG. 8A). Typically, roller 110 is stationary in the radial direction and is rotated along is longitudinal axis by a motor.

Referring now to FIG. 8B, in other exemplary embodiments, a roller 105 that covers less than the radial distance of printing zone 405 is used and roller 105 is movable in the radial direction. Typically, roller 110 is advanced in a radial direction to match location at which material is dispensed.

Referring to FIG. 8C, in yet other embodiments of the present invention, more than one roller is used to cover the printing zone. Optionally, a roller 107 positioned closer to a center of tray 400 is selected to have a smaller diameter than a roller 106 positioned further from the center. In rotational printing, a relative velocity of the roller with respect to tray 400 depends on radial position. Depending on a size of tray 400, this variation in relative velocities may have an impact on quality of a part quality and overall functionality of the machine. In some exemplary embodiments, the different diameters are selected to compensate for the variation in relative velocities.

Figure 9:
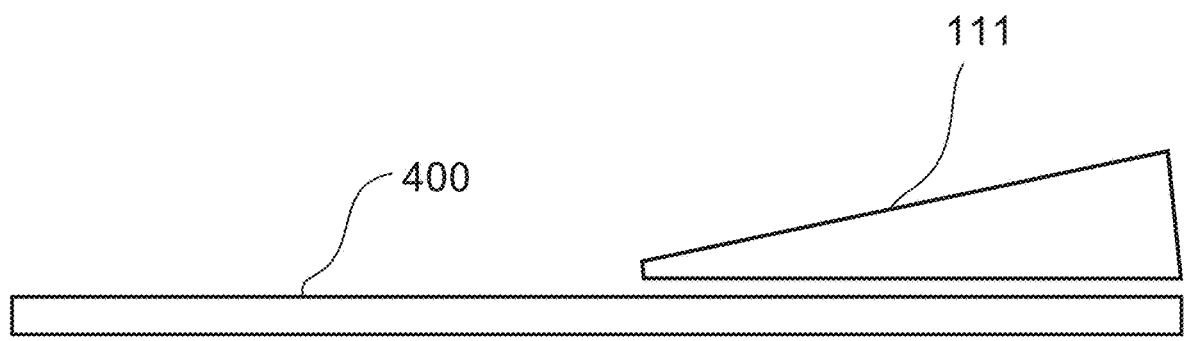
FIG. 9 is a schematic side view of a conical roller over a building tray in accordance with some embodiments of the present invention.

Reference is now made to FIG. 9 showing a schematic side view of a conical roller over a building tray in accordance with some embodiments of the present invention. According to some embodiments of the present invention, a roller 111 having a conical shape is used for leveling material dispensed over tray 400 during AM manufacturing. According to some embodiments of the present invention, the conical shape compensates for the variation in relative velocity of the roller with respect to tray 400. Typically, a diameter of the cone increases with increase distance from a center of tray 400. In alternate embodiments of the present invention, a cylindrical roller extending over an entire printing zone of tray 400 is sufficient for producing high print quality. In yet other embodiments of the present invention, more than one cone shaped roller is used to cover the printing zone of tray 400.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. An AM system comprising:
   a dispensing unit configured to dispense building material in a layer-wise manner to manufacture an object;
   a building tray positioned to receive the building material dispensed, wherein the building tray is configured to rotate while the dispensing unit dispenses the building material; and
   a leveling assembly configured to level the material dispensed on the tray, wherein the leveling assembly includes:
   roller configured to skim the building material dispensed, wherein the roller is aligned in a radial direction of the building tray;
   a blade configured to scrape material accumulated on the roller;
   a bath configured to collect material scraped by the blade; and
   an auger configured to clear the material on the blade and to transport the material cleared from the blade to a portion of the bath that extends beyond a length of the roller, wherein one end of the blade presses against the roller and an opposite end of the blade comes nearly in contact with the auger.

2. The system of claim 1, wherein the auger extends over an entire length of the bath and is housed in the bath and wherein the auger is engaged with a motor configured to rotate the auger along its longitudinal axis.

3. The system of claim 1, wherein the roller extends in the radial direction over an entire printing zone of the tray.

4. The system of claim 1, wherein the roller extends in the radial direction over only a portion of the printing zone of the tray.

5. The system of claim 4, wherein the roller is mounted on a stage that is configured to move in the radial direction.

6. The system of claim 4, comprising a plurality of rollers, each extending in the radial direction over a different portion of the printing zone of the tray.

7. The system of claim 1, wherein the blade is configured to provide a seamless surface between the roller and the auger.

8. The system of claim 1, wherein the portion of the bath includes a backflow channel configured to prevent backflow from being released toward the roller.

9. The system of claim 1, wherein a housing of the bath includes wicking channels configured to prevent backflow from being released toward the roller.

10. An apparatus comprising:
    a roller configured to skim a layer of material deposited by an additive manufacturing (AM) system;
    a blade configured to scrape material accumulated on the roller;
    a bath configured to collect material scraped by the blade; and
    an auger configured to transport material collected in the bath to a portion of the bath that extends beyond a length of the roller;
    wherein one end of the blade presses against the roller and an opposite end of the blade comes nearly in contact with the auger.

11. The apparatus of claim 10, wherein the auger is housed in the bath and wherein the auger extends over an entire length of the bath.

12. The apparatus of claim 10, wherein the auger is engaged with a motor configured to rotate the auger along its longitudinal axis.

13. The apparatus of claim 10, wherein the blade extends over an entire length of the roller.

14. The apparatus of claim 10, wherein a width of the blade extends from the roller to the auger.

15. The apparatus of claim 10, wherein the portion of the bath that extends beyond the length of the roller includes a cover configured to enclose the portion of the bath and wherein the bath is configured to create a pressure difference between the portion of the bath extends beyond the length of the roller and a second portion of the bath that extends along the length of the roller.

16. The apparatus of claim 10, wherein the auger includes a variable pitch thread and wherein a pitch of the auger extending over the length of the roller is wider than the pitch of the auger extending over the portion of the bath.

17. The apparatus of claim 10, wherein the AM system is a rotational 3D inkjet printer, wherein the roller is configured to skim the layer off a rotating building tray and wherein the roller extends in a radial direction of the rotating building tray.

18. The apparatus of claim 17, wherein the roller extends in the radial direction over only a portion of the printing zone of the tray.

19. The apparatus of claim 18, wherein the roller is mounted on a stage that is configured to move in the radial direction.

20. The apparatus of claim 18, comprising a plurality of rollers, each extending in the radial direction over a different portion of the printing zone of the tray, wherein each of the plurality of rollers have a different diameter.

21. The apparatus of claim 17, wherein the roller is a conical shaped roller.

22. The apparatus of claim 10, wherein the blade extends to a bottom of the bath to provide a seamless surface between the roller, the blade and the auger.

23. The apparatus of claim 10, wherein the portion of the bath includes at least one of a backflow channel and wicking channels, each configured to prevent backflow from being released toward the roller.

* * * * *